United States Patent [19]

Madey et al.

[11] Patent Number: 5,130,994
[45] Date of Patent: Jul. 14, 1992

[54] FREE-ELECTRON LASER OSCILLATOR FOR SIMULTANEOUS NARROW SPECTRAL RESOLUTION AND FAST TIME RESOLUTION SPECTROSCOPY

[75] Inventors: John M. J. Madey, 300-30 C Woodcroft Pkwy., Durham, N.C. 27713; Eric B. Szarmes, Durham, N.C.

[73] Assignee: John M. J. Madey, Durham, N.C.

[21] Appl. No.: 722,374

[22] Filed: Jun. 25, 1991

Related U.S. Application Data

[63] Continuation of Ser. No. 398,654, Aug. 25, 1989, abandoned.

[51] Int. Cl.$^5$ .................................................. H01S 3/00
[52] U.S. Cl. ............................................ 372/2; 372/18; 372/25; 372/108
[58] Field of Search ......................... 372/2, 25, 18, 108

[56] References Cited

U.S. PATENT DOCUMENTS

4,748,629  5/1988  Edlin et al. ............................. 372/2
4,845,718  7/1989  Pistoresi ................................. 372/2

FOREIGN PATENT DOCUMENTS

9103084  3/1991  PCT Int'l Appl. .

OTHER PUBLICATIONS

B. D. McVey et al., "Numerical Simulations of Free Electron . . . " NIMPR A285, (1989) 186-191, North-Holland, Amsterdam.
Gerald T. Moore; "Frequency Chirping of the Free-Electron Laser"; *Physical Review Letters*; vol. 60, No. 18; pp. 1825-1827; May 2, 1988.
Gerald T. Moore; "The Chirped-Pulse Free Electron Laser"; *Nuclear Instruments and Methods in Physics Research*; A272 (1988); pp. 302-310, Oct. 3, 1988.
Stephen V. Benzon, John Schultz, Brett A. Hooper, Richard Crane, John M. J. Madey; "Status Report on the Stanford Mark III Infrared Free Electron Laser"; *Nuclear Instruments and Methods in Physics Research*; A272 (1988); pp. 22-28; Oct. 8, 1988.
D. Oepts, A. F. G. Van Der Meer, R. W. B. Best and P. W. Van Amersfoort; "Simulations of Mode Reduction with an Intracavity Etalon in an RF-Linac Based FEL"; *Nuclear Instruments and Methods in Physics Research*; A285 (1989); pp. 204-210, Dec. 10, 1989.
Gerald T. Moore and John C. Goldstein; "Chirping for Efficiency Enhancement of the Free Electron Laser"; *Nuclear Instruments and Methods in Physics Research*; A285 pp. 176-185, Dec. 10, 1989.

*Primary Examiner*—Léon Scott, Jr.
*Attorney, Agent, or Firm*—Townsend and Townsend

[57] ABSTRACT

The present invention provides in a Free electron laser a means to increase the temporal resolution of the optical pulses while simultaneously increasing the spectral resolution of the pulse train. The increase in temporal resolution is achieved by introducing a quadratic temporal phase variation (i.e. linear frequency chirping) across the pulses, and then propagating the outcoupled pulses through a dispersive relay line to compress them to the transform limit of the broadened spectrum.

21 Claims, 12 Drawing Sheets

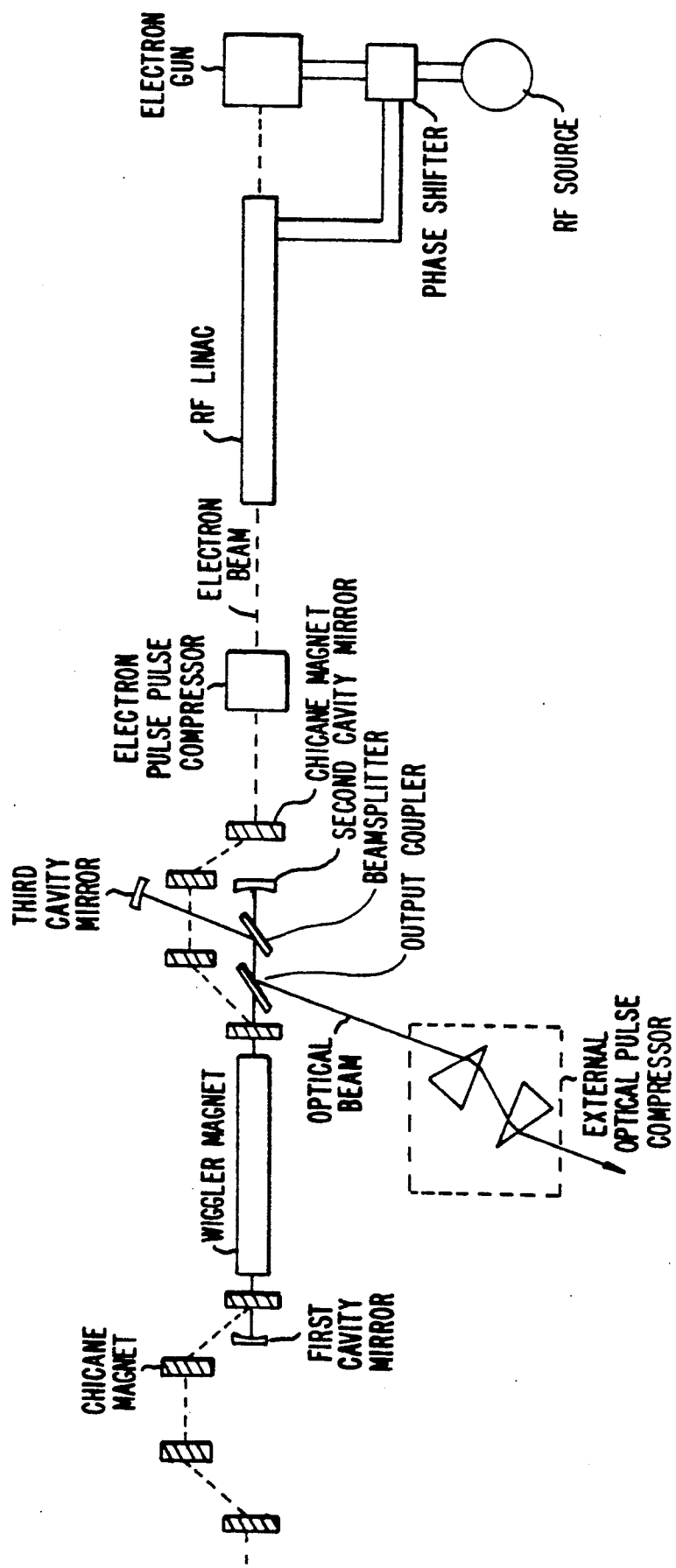
FIG._1.

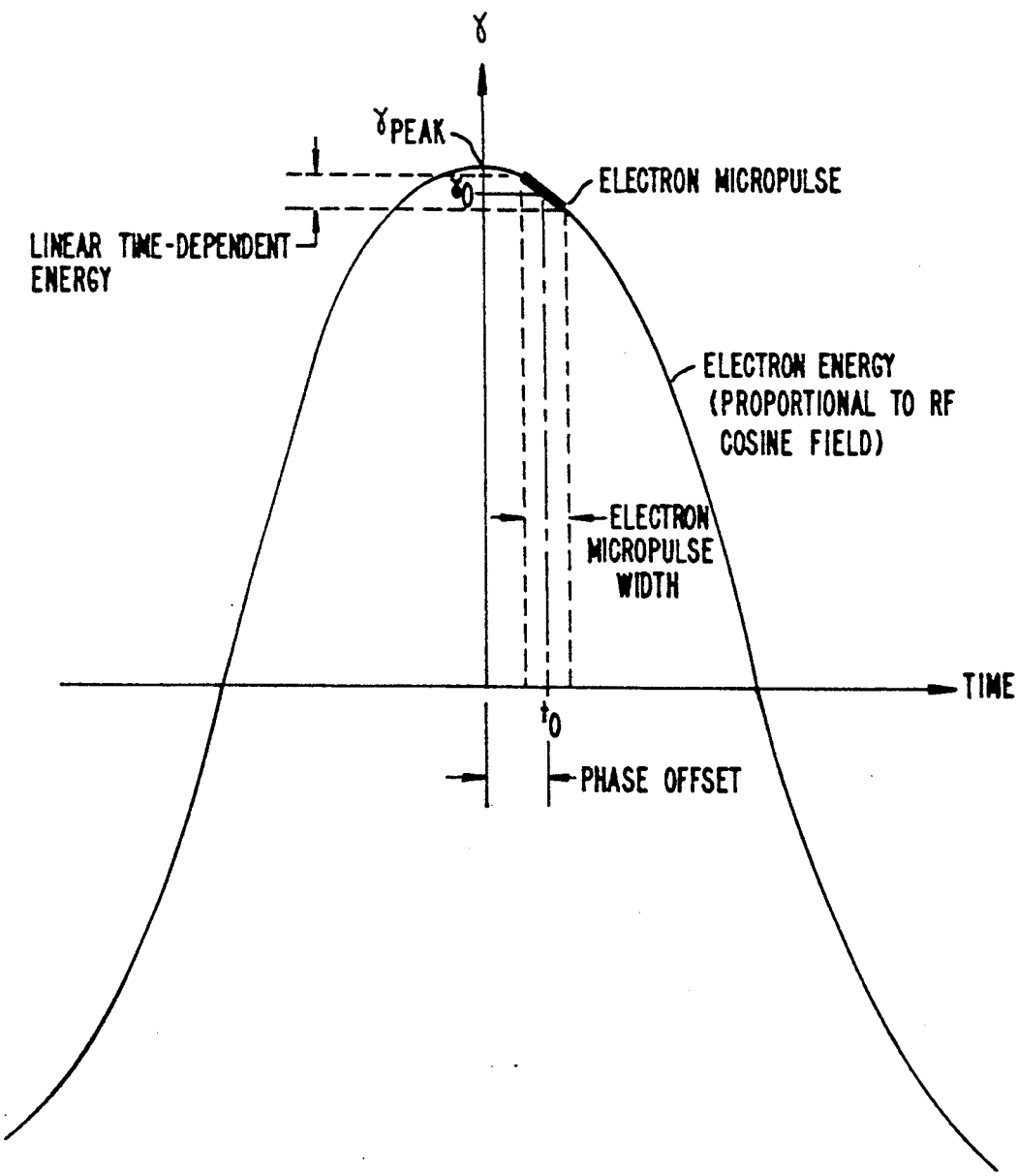
FIG._2.

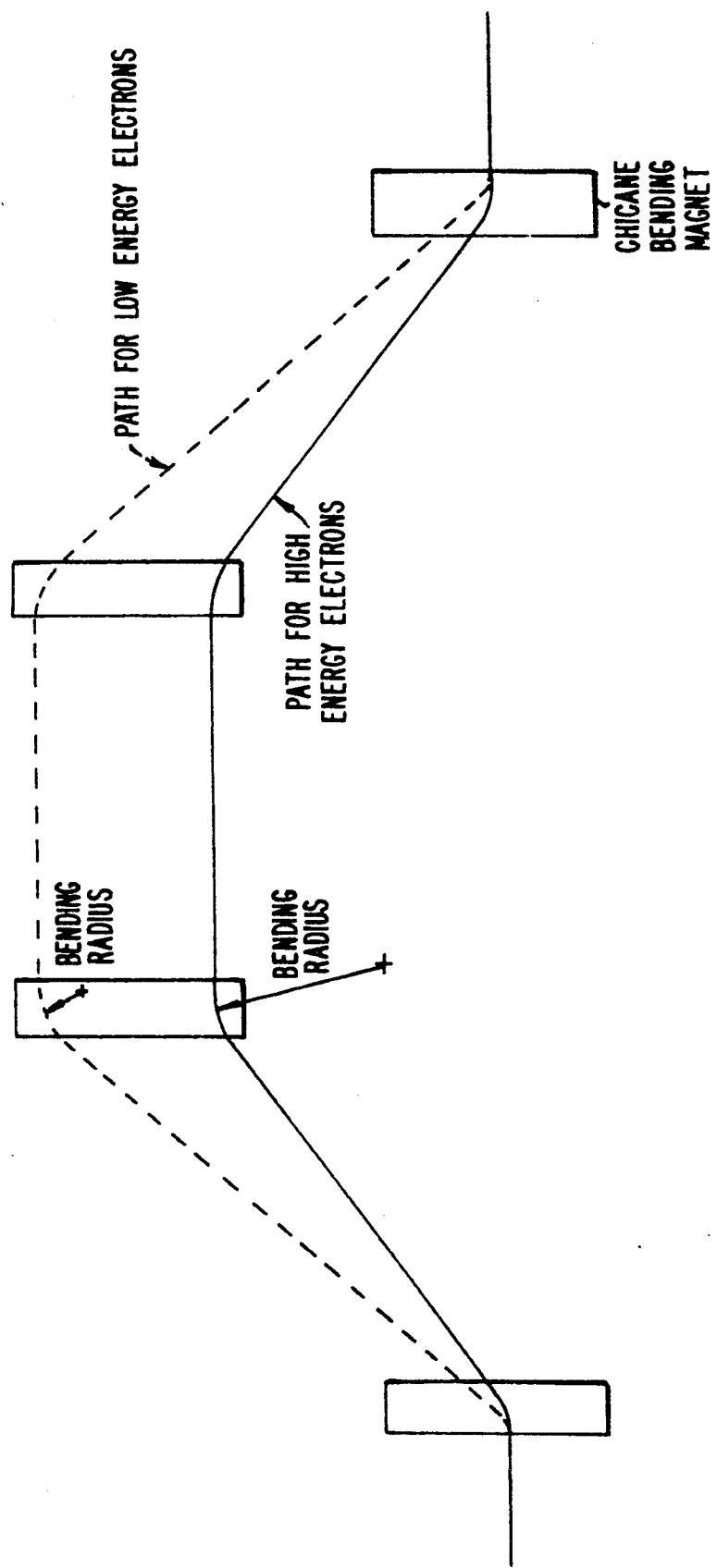
FIG._3.

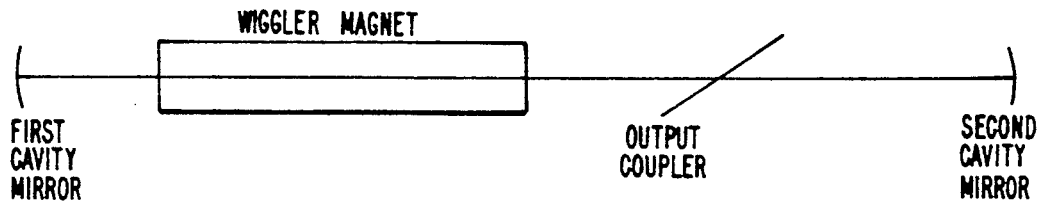
FIG._4.
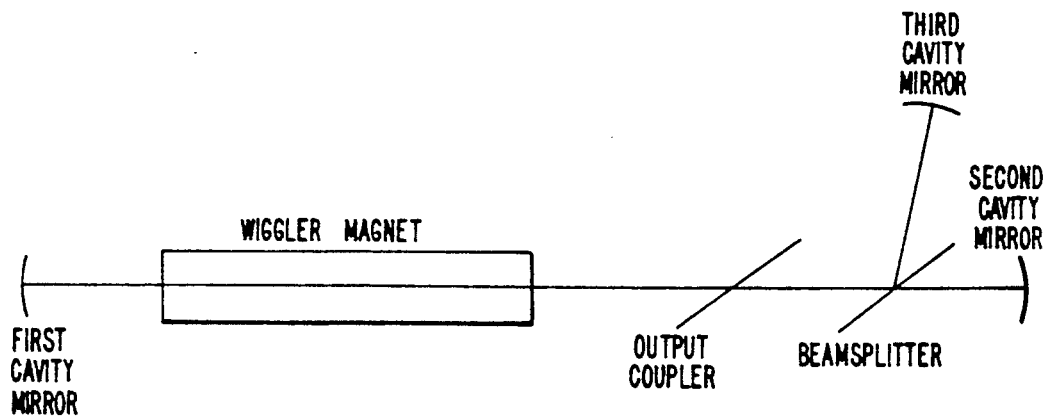
FIG._5.
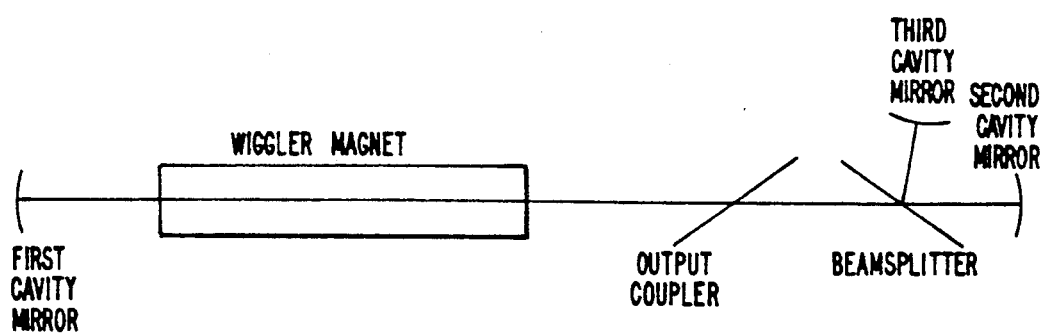
FIG._6.

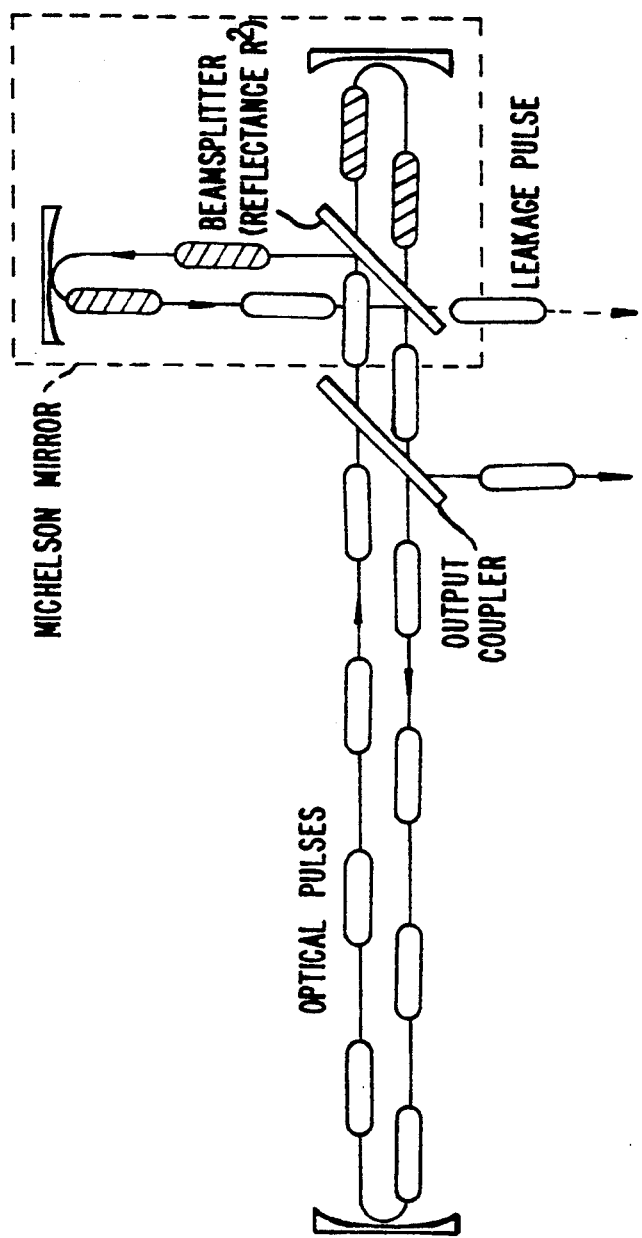
FIG._7.

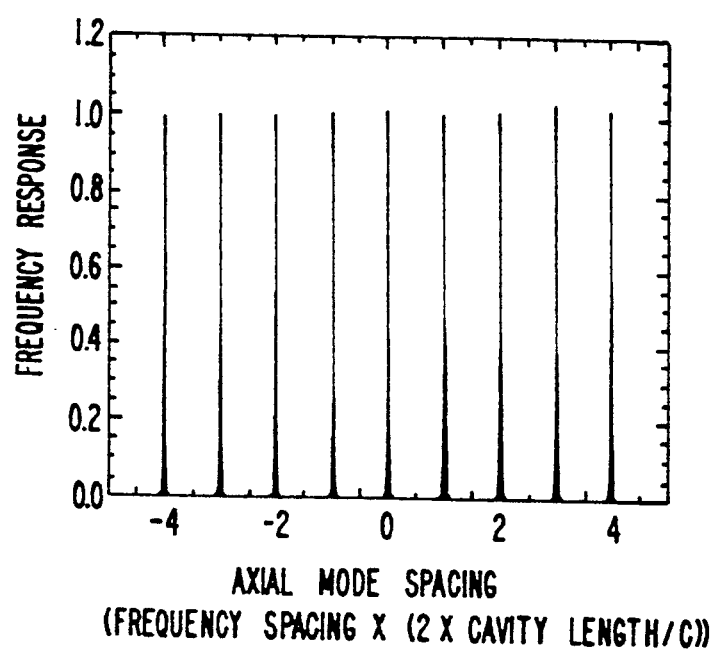
FIG._8.

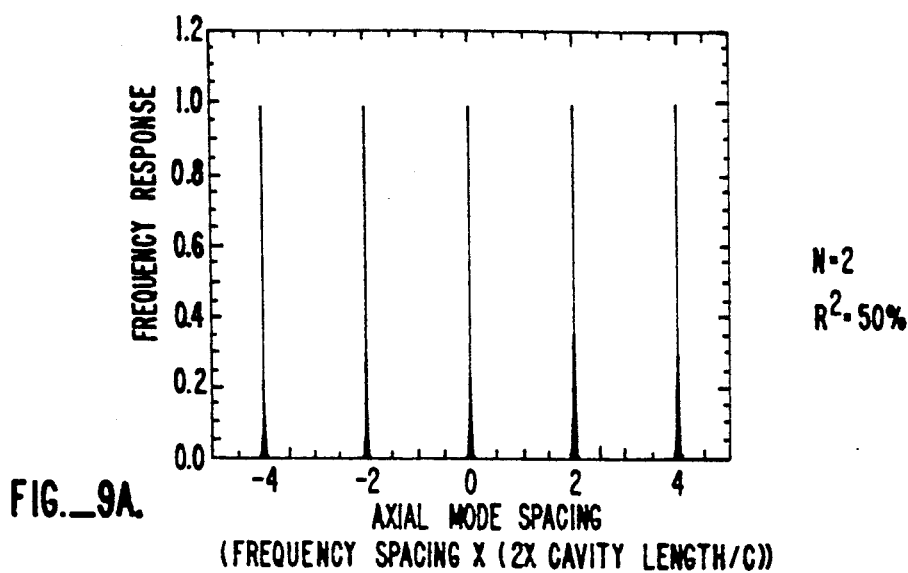
FIG._9A.
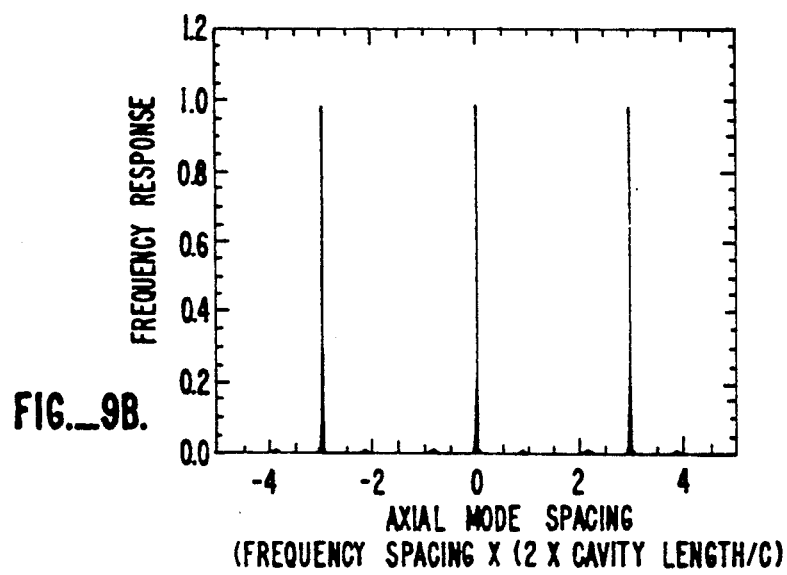
FIG._9B.
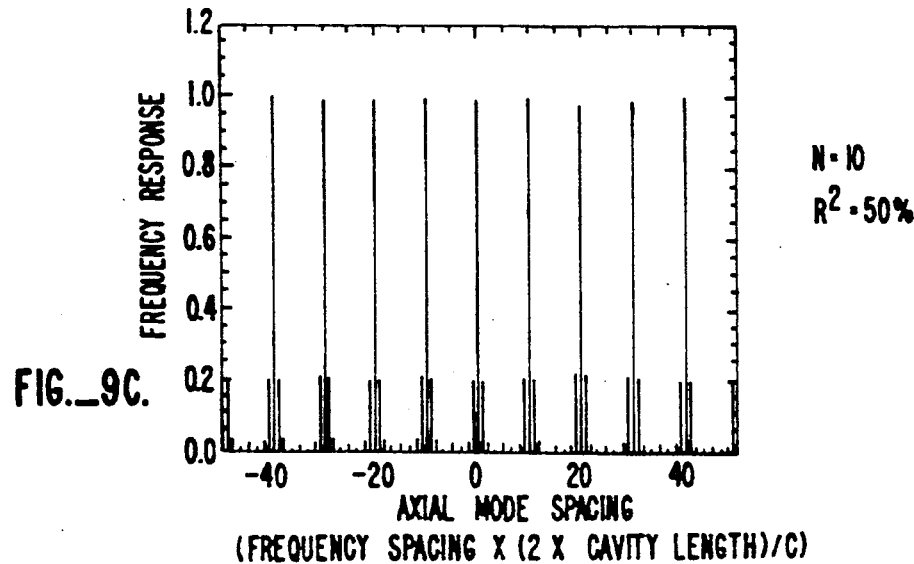
FIG._9C.

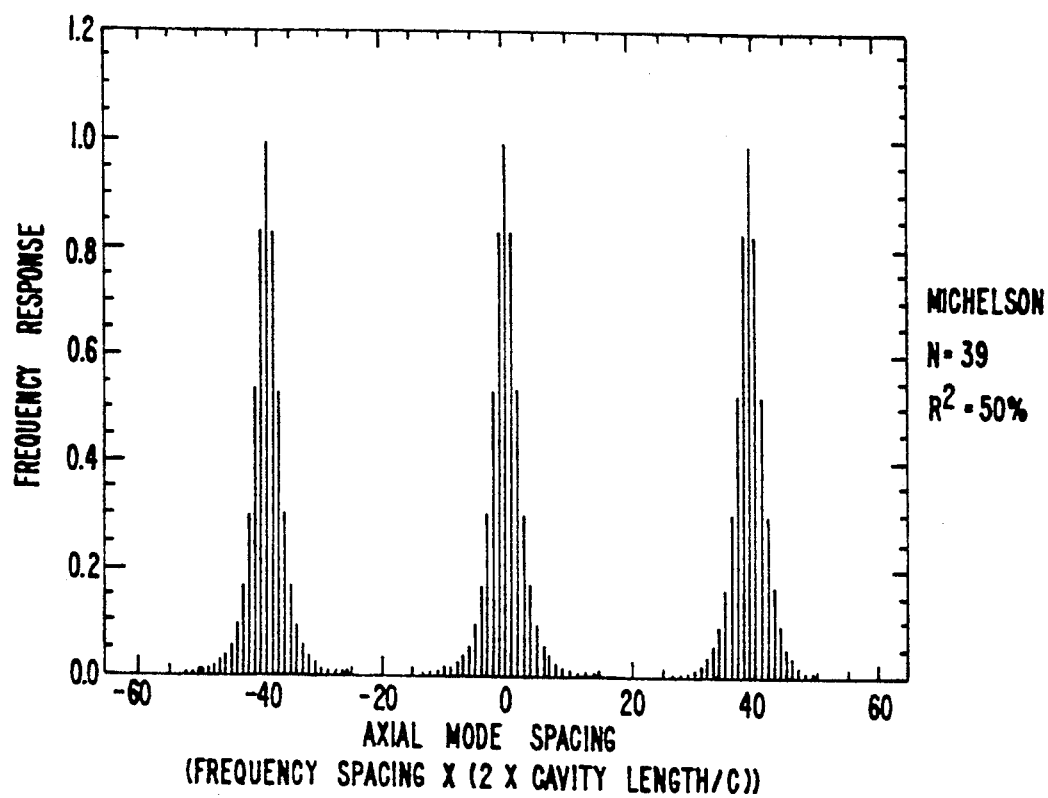
FIG._10A.
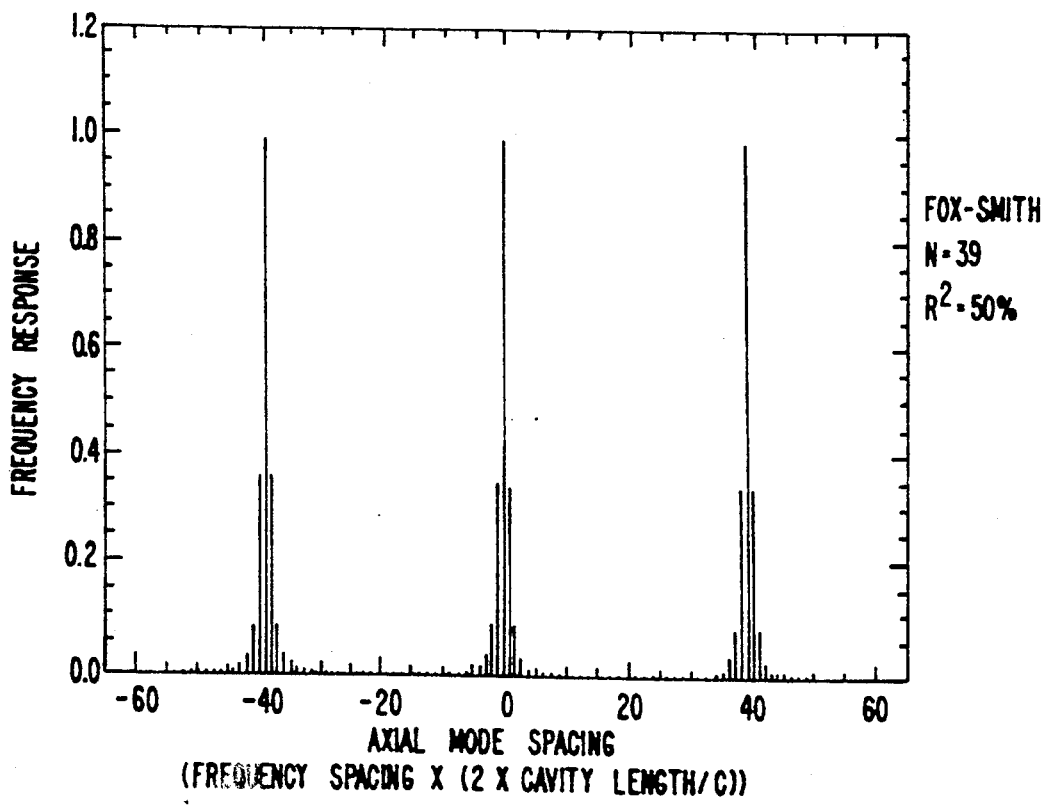
FIG._10B.

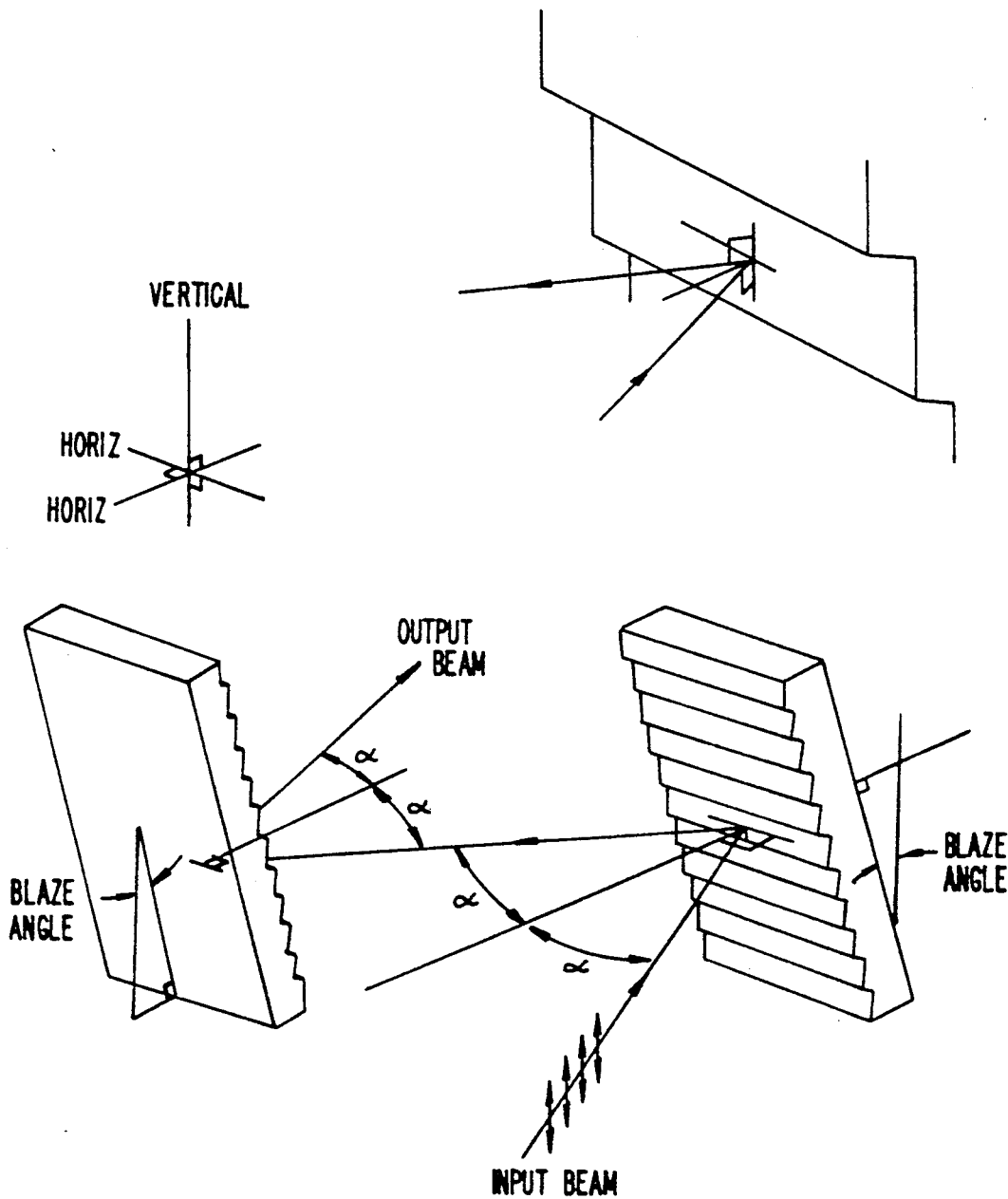
FIG.─11.

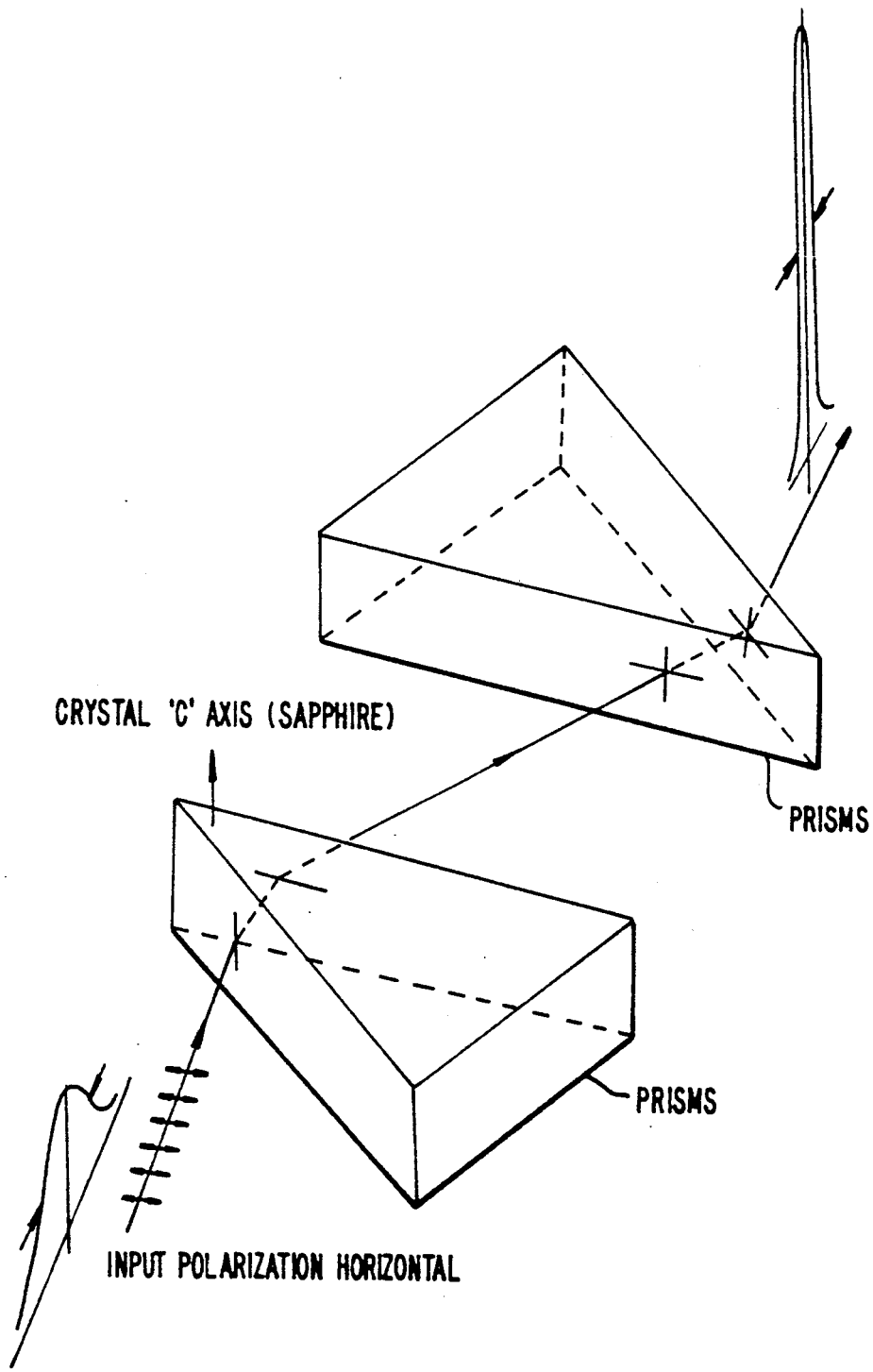
FIG._12.

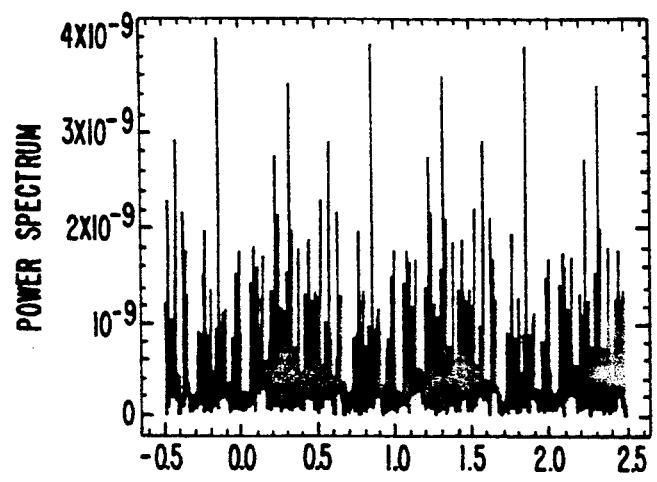
FIG._13A.
MICHELSON
N=35
$R^2 = 50\%$
5 PASSES
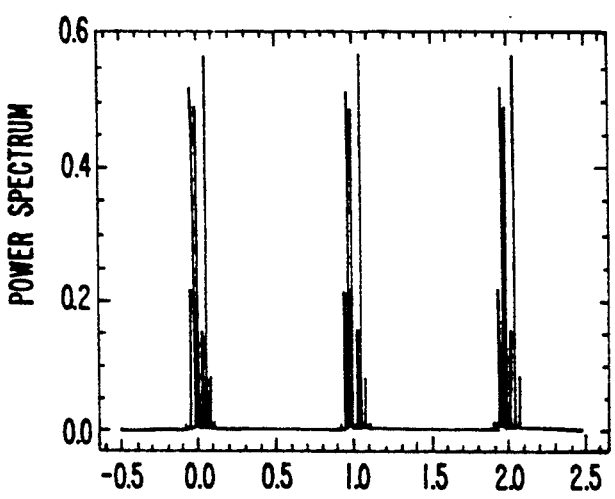
FIG._13B.
MICHELSON
N=35
$R^2 = 50\%$
60 PASSES
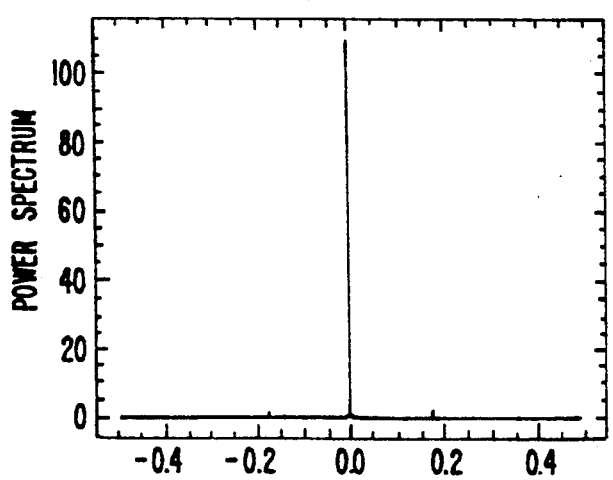
FIG._13C.
FOX-SMITH
N=35
$R^2 = 50\%$
100 PASSES

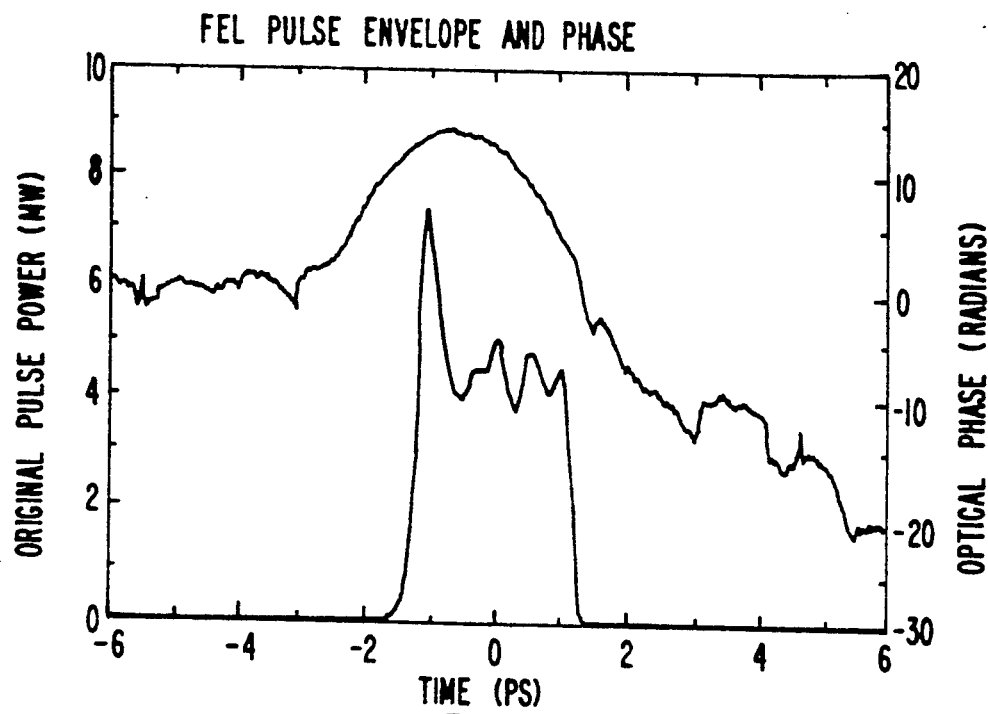
FIG._14A.
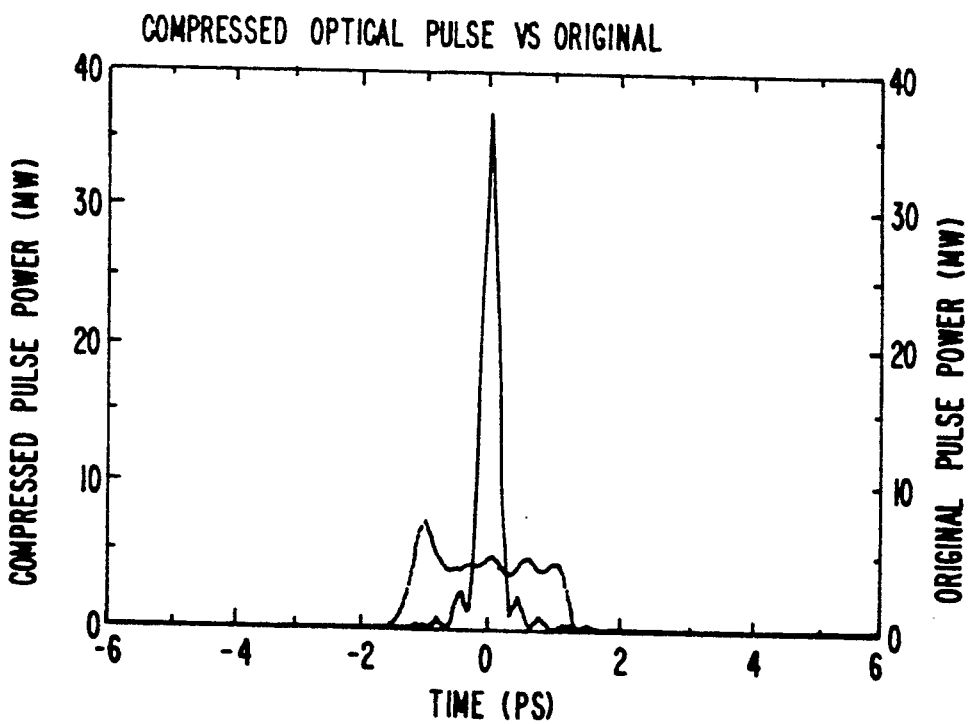
FIG._14B.

FREE-ELECTRON LASER OSCILLATOR FOR SIMULTANEOUS NARROW SPECTRAL RESOLUTION AND FAST TIME RESOLUTION SPECTROSCOPY

This is a continuation of application Ser. No. 07/398,654, filed Aug. 25, 1989, now abandoned.

BACKGROUND OF THE INVENTION

The present invention relates to the temporal and spectral resolution of optical beams from free-electron lasers.

Free-electron laser (FEL) oscillators driven by pulsed RF linear accelerators (RF linacs) typically produce optical pulses of a duration determined by the width of the electron micropulses delivered by the linac. For example, the Mark III infrared FEL, which is driven by a 45 MeV, 2.856 GHz RF linac and delivers electron micropulses of several picoseconds duration, produces optical pulses with a characteristic width of ~2 ps and a separation of 350 ps (the RF period of the linac). In order for the optical pulses to build up from pass to pass within the oscillator, the cavity length must be close to the synchronous length, defined as that length for which the round trip time of a free-space optical pulse exactly matches a given integer multiple of the arrival time between adjacent electron micropulses; that integer also corresponds to the number of independently oscillating optical pulses contained within the cavity at any instant. These electron micropulses are grouped into macropulses with a 1-8 microsecond duration and a repetition rate on the order of several tens of Hertz. Therefore, each macropulse can yield many thousand outcoupled optical pulses, depending on its duration.

The fundamental limits to time resolution and spectral resolution in measurements using the optical beam of such an FEL are the width and spacing of the individual optical pulses generated by the FEL, and the degree of phase coherence between adjacent pulses in the pulse train. As indicated above, the optical pulse width is primarily determined by the duration of the electron micropulses, with further variations provided by the deviation of the cavity length from the synchronous length. The shortest optical pulses obtained to date have yielded a FWHM width of ~500 femtoseconds.

The spectral energy distribution is determined by the temporal variations of power and phase within the individual optical pulses, and by the absolute fluctuations of these quantities between and among the pulses in the pulse train. The temporal variations within the pulses yield a spectral envelope which can be no narrower than the transform limit defined by the inverse of the width of the optical pulses. This width would obtain if there were no temporal phase variations within the individual pulses, whereas the actual envelope may be broader if there are significant systematic or random phase variations within these pulses.

The modulation of the spectrum within this broad envelope is determined by the power and phase fluctuations between and among the individual pulses in the pulse train. In the Mark III FEL+, the individual optical pulses each complete a round trip through the cavity every 13.7 nanoseconds. Since all of the pulses within the cavity at any instant possess random relative phases (due to the random nature of the spontaneous radiation from which the pulses build up), that interval is also the smallest period at which the output pulses repeat themselves. The corresponding spectrum is a Fourier series consisting of a series of lines separated by $1/(13.7 \text{ ns}) = 73$ MHz filling the spectral envelope defined by the individual pulses. The width of these spectral lines is determined by the Q of the resonator and the noise introduced by spontaneous emission. Fractional widths $\Delta\lambda/\lambda$ on the order of $10^{-8}$ are attainable at the typical 5% outcouplings used in the Mark III (with < 2% extraneous cavity losses); the corresponding finesse of the resonator for these losses is 90.

+Benson, S. V., J. Schultz, B. A. Hooper, R. Crane, and J. M. J. Madey; "Status report on the Stanford Mark III infrared free-electron laser"; in Proceedings of the Ninth International Free-electron Laser Conference; P. Sprangle, C. M. Tang, J. Walsh, ed. (1987).

SUMMARY OF THE INVENTION

The present invention provides a means to increase the temporal resolution of the optical pulses while simultaneously increasing the spectral resolution of the pulse train. The increase in temporal resolution is achieved by introducing a quadratic temporal phase variation (ie. linear frequency chirp) across the optical pulses, and then propagating the outcoupled pulses through a dispersive delay line such as grating pair or prism pair in order to compress them to the transform limit of the broadened spectrum. Essentially, the quadratic time dependence of the optical phase broadens the spectrum and yields Fourier components whose phase exhibits a quadratic frequency dependence. The essence of the compression technique is then to 'compensate', or nullify, the spectral phase content so that the remaining spectral envelope represents the Fourier transform of a very short pulse (the so called transform limited pulse). In effect, the temporal frequency chirp increases the spectral content of the pulse, and the process of compensation then redistributes this (conserved) spectral width between the envelope and phase functions.

The present compression technique differs from existing techniques in that the frequency chirp is induced directly via the gain mechanism, as opposed to passive propagation of the short pulses through nonlinear media such as optical fibers. To operate a free-electron laser in such a configuration, electron micropulses with a linear time-dependent energy are produced in the RF linac by positioning the bunches slightly off the peak of the RF wave at phases where the field gradient is large. These electron micropulses are injected into the wiggler and lead to the formation of optical pulses with a corresponding linear time-dependent frequency given approximately by the resonance condition:

$$\lambda_{opt} = \lambda_{wig}(1+K^2)/2\gamma^2$$

where $\lambda_{opt}$ is the wavelength of the optical pulse, $\lambda_{wig}$ is the period of the wiggler magnet, $\gamma$ is the ratio of the electron energy to the rest mass energy, $K = eB\lambda_{wig}/2\pi mc^2$ is the undulator parameter, and B is the wiggler magnetic field. The time dependence of the optical frequency (or wavelength) follows explicitly from the dependence of $\lambda_{opt}$ on $\gamma$, $\delta\lambda/\lambda = 2\delta\lambda/\lambda$, and the resulting chirped optical pulses are then outcoupled from the optical cavity and compressed in an external dispersive delay line.

The production of short optical pulses in the invention is combined with the capability to increase the spectral resolution of the pulse train by increasing the finesse of the resonator. In the previously cited Mark III FEL there are 39 independently oscillating optical pulses within the cavity at any instant. As previously noted, the resulting Fourier spectrum consists of a series of lines separated by the inverse of the round trip time for any given pulse. In the present invention, the linear resonator is replaced with a multiple mirror cavity such as a Michelson mirror resonator or a Fox-Smith interferometer to provide coupling among adjacent optical pulses as they build up from noise. In this fashion, successive pulses can be made to oscillate with a definite phase relationship which is maintained for the duration of the macropulse. The corresponding Fourier spectrum then consists of a series of lines separated by the inverse of the time interval between adjacent pulses. This increase in free spectral range yields a finesse greater than that of the linear cavity by a factor equal to the number of pulses contained in the linear cavity. The previously calculated finesse of $\sim 90$ for that cavity is increased to $\sim 3500$ by this process. As explained further below, the entire free spectral range can be continously scanned without degrading either the finesse of the resonator or the pulse compression capability.

Pulse coupling can be accomplished by providing an extra delay of one RF period in the secondary arm of a Michelson interferometer incorporated within the cavity, so that phase information from any given pulse is coupled to its successor via the beamsplitter; the maximum interpulse coupling for such a cavity is obtained for a beamsplitter reflectance of 50%. This process leads to successively phaselocked, optical pulses because only those adjacent pulses will survive which interfere constructively in the direction of the wiggler bore. In the case of a Fox-Smith interferometer the coupling is more complex because each optical pulse is coupled to many of its successors due to the repeated transits of the pulses within the interferometer portion of the resonator. Furthermore, the interpulse coupling for the Fox-Smith resonator increases monotonically for increasing beamsplitter reflectance. These are the primary differences between these two methods of coupling.

SUMMARY OF INDIVIDUAL COMPONENTS

The four main components required by this invention are 1) an electron beam source and accelerator with the capability of providing high charge electron micropulses with a linear energy dependence on time, 2) an electron beam pulse compression system immediately in front of the wiggler to provide high peak currents and short electron pulses, 3) an optical cavity in the configuration of a Michelson mirror resonator or a Fox-Smith interferometer to provide phase coupling among all of the simultaneously oscillating optical pulses, and 4) an external dispersive delay line to act as a pulse compressor for the chirped, outcoupled optical pulses. These components are displayed in a typical configuration in FIG. 1.

1) Electron beam source and accelerator

The electron gun used in this invention should provide a high brightness, low emittance electron beam, should be driven by the same RF source which drives the accelerator, and should provide the capability to vary the electron pulse length prior to injection into the linac. The technology for such electron beam guns is well established and will not be further described here (see, for example, U.S. Pat. No. 4,641,103).

Electron pulses with a linear energy dependence on time are produced by adjusting the phase of the electron pulses from the gun and the phase of the accelerating RF field. This concept is illustrated in FIG. 2. This adjustment capability is used in present FELs to inject the electron pulses at the peak of the RF accelerating field to minimize the relative field gradient and hence the energy spread across the pulses. In the present invention, the injection phase should be adjusted so that the pulses are accelerated off of the peak of the RF wave. The time dependence of the normalized electron energy $\gamma$ can be described in such a case by $$\gamma = \gamma_{peak} \cos(\phi)$$

or $$\gamma = \gamma_{peak} \cos(\omega_{rf} t)$$

in which $\phi$ is the mean phase of the electron pulse relative to the peak field, and $\cos(\omega_{rf} t)$ describes the time dependence of the electron energy at that point. From these equations obtains an expression for the time dependence of the energy chirp of the electron pulse, $$|d\gamma/dt| = \omega_{rf} \gamma_{peak} \sin(\phi) = \omega_{rf} \gamma \cdot \tan(\phi)$$

yielding $$\Delta\gamma/\gamma = \omega_{rf} \tan(\phi) \cdot \Delta t$$

or $$(\gamma(t) - \gamma_0)/\gamma_0 = \omega_{rf} \tan(\phi) \cdot (t - t_0)$$

where $\gamma_0$ is the energy at some reference time to within the electron pulse, and $\gamma(t)$ is the energy at other times t.

2) Electron beam pulse compressor

To obtain the maximum compression ratio for the optical pulses which build up from the chirped electron beam, the laser should be operated with the maximum possible electron energy chirp. Then, as indicated by the FEL resonance condition, the spectral width of the optical pulses will be as large as possible and propagation of these pulses through a dispersive delay line will create the shortest optical pulses. These considerations suggest that the accelerator be operated with the largest possible electron pulse phase offset and pulse width. However, because the charge contained in each pulse is limited by the gun, this mode of operation can decrease the beam current and hence the gain of the laser.

To prevent this degradation of performance, the present invention includes an electron beam compressor to recompress the electron pulses before injection into the wiggler. This compression can be achieved with a passive magnetic dispersive section. In a specific example, the magnetic chicane preceeding the FEL wiggler magnet can be designed to serve as the compressor for electron pulses with energies increasing towards the trailing edge. FIG. 3 shows the configuration of such a chicane. These chicanes are provided in order to bend the electron beam around the cavity mirrors while preserving the transverse beam size for beams with a finite energy spread. However, high energy electrons traverse the chicanes in a shorter time than low energy electrons due to the shorter path length which results from the larger bending radii at higher energies, and so it is clear that such a system could be designed as an appropriate compressor in the present example. (The chicanes in the previously cited Mark III FEL have a dispersion of approximately 1 picosecond per % energy spread.)

3) Optical Cavity

The optical cavity in the present invention must be configured to provide passive coupling between successive pulses in the pulse train by means of a Michelson mirror resonator or a Fox-Smith interferometer. In each case, the resonator will consist of three cavity mirrors, a beamsplitter for coupling successive pulses, and a Brewster plate output coupler. FIGS. 5 and 6 illustrate specfic configurations of these cavities in relation to the conventional linear FEL cavity which is displayed in FIG. 4, and FIG. 7 shows the relation among the optical pulses in a Michelson mirror resonator with 1 RF period of delay in the secondary arm. The distinguishing features between the Michelson and Fox-Smith resonators are the orientation of the beamsplitter and the position of the third cavity mirror relative to both the beamsplitter and the second cavity mirror. The result is that the gain medium is contained within two linear resonators in the Michelson case, but within only one linear resonator in the Fox-Smith case. The important parameters to control or specify in the operation of either of these systems are the number of optical pulses circulating within the cavity, the number of RF periods of delay provided by the secondary arm of the interferometer, the output coupling, the beamsplitter reflectance, the phase offset (on the scale of an optical wavelength) of the third cavity mirror relative to both the beamsplitter and the second cavity mirror, and the detunings (on the scale of an optical pulse length) of the first and third cavity mirrors relative to the synchronous length.

As previously noted, these multiple mirror resonators exhibit a free spectral range greater than that of a conventional two mirror linear cavity by a factor equal to the number of pulses contained in the linear cavity. This is illustrated by a comparison of the passive mode structure of these cavities when excited by a tunable source of constant amplitude coupled into the cavity through the Brewster plate output coupler. FIG. 8 shows the frequency response for a linear cavity with a 7% round trip power loss. FIG. 9 shows the frequency response for a Michelson mirror resonator with a 7% round trip power loss and a round trip time of 2, 3, and 10 RF periods. FIG. 10 shows the frequency response for both Michelson mirror resonator and Fox-Smith interferometer with a 7% round trip power loss and a round trip time of 39 RF periods. The other parameters in FIGS. 9 and 10 are one RF period of delay in the secondary arm of the interferometer, 50% beamsplitter reflectance, zero relative phase offset on the third cavity mirror, and zero detuning for both the first and third cavity mirrors.

While each of these figures displays the anticipated increased free spectral range, they also exhibit the presence of satellite spectra displaced from the primary modes at roughly integral multiples of the linear cavity axial mode spacing. These actually represent modes which oscillate with substantially higher losses due to destructive interference of the circulating CW field at the beamsplitter, and are manifest as steady state modes in the above figures simply due to the forced excitation of the cavity by the external source. When used with FELs driven by pulsed RF linacs, the excitation mechanism differs from the one considered above; under pulsed (as opposed to CW) excitation, these satellite modes will decay away relative to the primary modes as the optical macropulse evolves. The decay rates for these satellite lines are proportional to the losses that are indicated in the above figures.

To further quantify these assertions, the following mathematical analysis can be used to approximate the mode losses under pulsed excitation in the small signal regime.

Consider the coupling of $N = 4$ optical pulses circulating within a Michelson mirror resonator with 1 RF period of delay in the secondary arm of the interferometer, a net round trip gain of $e^{2\alpha}$, a beamsplitter of reflectance $r^2$ and transmittance $t^2 = 1 - r^2$, a relative phase offset of $\phi$ on the third cavity mirror, and zero detunings on both the first and third cavity mirrors. Let the phasor amplitudes of these pulses be represented by $E_i(n)$, where i labels the pulses within the cavity (i = 1, ...,N) and n labels the pass number. Then the following set of equations describes the pass to pass evolution of the coupled pulses which arrive in the order $E_1$, $E_2$, $E_3$, $E_4$, $E_1$, $E_2$, etc.

$$E_1(n+1) = e^\alpha[E_1(n)t^2 + E_4(n-1)r^2 e^{j\phi}]$$

$$E_2(n+1) = e^\alpha[E_2(n)t^2 + E_1(n)r^2 e^{j\phi}]$$

$$E_3(n+1) = e^\alpha[E_3(n)t^2 + E_2(n)r^2 e^{j\phi}]$$

$$E_4(n+1) = e^\alpha[E_4(n)t^2 + E_3(n)r^2 e^{j\phi}]$$

We search for eigenmode solutions of the form
$$E_i(n+1) = E_i(n)e^\lambda = E_{o,i}e^{\lambda n}$$

where $\lambda$ is independent of n and is by definition the same for all N pulses (this is required by the symmetry of the system with respect to time displacement). The above set of equations can therefore be recast into a matrix format for which the eigenvalue problem can be solved for specific values of the parameters $r^2$, $t^2$, and $\phi$. If we set $\gamma = e^\lambda$ and define the column vector $[E] = E_1\ E_2\ E_3\ E_4$, then we obtain the following matrix equation:

$$[E(n+1)] = \gamma[E(n)] = \begin{bmatrix} e^\alpha t^2 & 0 & 0 & \gamma^{-1}e^\alpha r^2 e^{j\phi} \\ e^\alpha r^2 e^{j\phi} & e^\alpha t^2 & 0 & 0 \\ 0 & e^\alpha r^2 e^{j\phi} & e^\alpha t^2 & 0 \\ 0 & 0 & e^\alpha r^2 e^{j\phi} & e^\alpha t^2 \end{bmatrix}[E(n)]$$

and the eigenvalues are extracted from the secular equation as specific solutions of the following four equations, $$\gamma = e^\alpha(t^2 - r^2 e^{j\phi}/\gamma^{1/4}), \gamma = e^\alpha(t^2 - jr^2 e^{j\phi}/\gamma^{1/4})$$

$$\gamma = e^\alpha(t^2 + r^2 e^{j\phi}/\gamma^{1/4}), \gamma = e^\alpha(t^2 + jr^2 e^{j\phi}/\gamma^{1/4})$$

The corresponding solutions for the case of N circulating pulses are $$\gamma m = e^\alpha[t^2 - (-1)^N e^{-j2\pi m/N} \cdot r^2 e^{j\phi}/\gamma_m^{1/N}],$$
$$m = 0, 1, \ldots, N-1$$

... (D)

The associated eigenvectors can be calculated for each of these eigenvalues and can be identified as distinct spectral modes of the pulse train (see below).

Evidently, this is an irregular eigenvalue problem due to the presence of the eigenvalue in the the upper right hand matrix element of the coupling matrix. In consequence, the eigenmodes identified above do not necessarily constitute a general solution. However, the superposition of these modes does form an approximate solution which accurately predicts the pulse train evolution. Moreover, as N becomes large, the denominator in the second term for the eigenvalues in equation (D) approaches unity for any value of $\gamma_m$, and the associated eigenvectors approach solutions whose superposition forms an exact solution to the initial value problem. The solution to the coupling equations in the limit of large N is $$[E(n)] = \Sigma_m c_m [V]_m \exp(n \cdot \log_e \gamma_m), m = 0, 1, \ldots, N - 1$$

where $\gamma_m = e^\alpha [r^2 - (-1)^N e^{-j2\pi m/N} \cdot r^2 e^{j\phi}]$ and $$[V]_m = \begin{bmatrix} 1 \\ (-1)^{N-1} e^{j2\pi m/N} \\ (+1)^{N-1} e^{j4\pi m/N} \\ (-1)^{N-1} e^{j6\pi m/N} \\ (+1)^{N-1} e^{j8\pi m/N} \\ \vdots \\ (N \text{ elements}) \end{bmatrix}$$

These eigenvectors $[V]_m$ correspond to distinct spectral modes displaced from one another by one linear cavity axial mode spacing (as can be demonstrated by computing the Fourier series for each eigenvector), and therefore fill the entire free spectral range of the multiple mirror resonator. Physically, these modes represent configurations in which each pulse differs in phase from its successor by $2\pi m/N$. This ensures that any given pulse is always in phase with itself from pass to pass. For any value of $\phi$, one of these modes will have the largest growth rate relative to the other modes and will dominate the spectrum as the macropulse evolves. Therefore, each mode can be selected in turn by varying the value of $\phi$ at the third cavity mirror. The relative growth rates of the modes are calculated from the eigenvalues $\gamma_m$, $$|\gamma_m|^2 = |r^2 - (-1)^N r^2 e^{j(\phi - 2\pi m/N)}|^2$$

Consider a numerical example for the Michelson mirror resonator with 39 circulating pulses and 50% beamsplitter reflectance. In this case the relative single pass power growth for the dominant mode and its two nearest neighbours ($\phi = 0$, m = 0,1,2) is 1:0.9935:0.9743. The relative power after 400 passes is therefore 1:0.07:0.00003; this number of passes corresponds to a time of 5.5 microseconds for the Mark III FEL.

Analysis of the Fox-Smith interferometer is more complicated due to multiple reflections, but a simplified analysis of the mode losses for that resonator to the same order of approximation predicts extinction ratios for the decaying modes which are greater than those for the Michelson mirror resonator with the same beamsplitter reflectance. The eigenvalues $|\gamma_m|^2$ for the case of N = 39 circulating pulses and 1 RF period of delay in the secondary arm of the interferometer are $$|\gamma_m|^2 = \left| \frac{1 - r^2 + r^{80} e^{j39(\phi - 2\pi m/N)}(1 - e^{j(\phi - 2\pi m/N)})}{1 - r^2 e^{j(\phi - 2\pi m/N)}} \right|^2$$

For $r^2 = 50\%$, the relative single pass power growth for the dominant mode and its two nearest neighbours ($\phi = 0$, m = 0,1,2) is 1:0.9508:0.8293; after 50 passes the relative power is 1:0.08:0.0001. This number of passes corresponds to a time of 0.69 microseconds for the Mark III FEL.

The discrete adjustment of the frequency of the eigenmodes is provided by the variation of $\phi$ as discussed in a previous paragraph. Continuous adjustment of the eigenmode frequency is then provided by varying the position of the first cavity mirror. It is clear that a range of adjustment corresponding to plus or minus one half of the axial mode spacing for a linear cavity, in combination with the discrete adjustment described above, is sufficient to cover the entire free spectral range of the multiple mirror resonator. Given the desired frequency adjustment, the required change in position of the first cavity mirror is determined by the axial mode relation for the linear cavity. This is given by $$\nu = N'(c/2L)$$

where $\nu$ is the absolute frequency, c is the speed of light, L is the linear cavity length, and N' is the absolute axial mode number which is a constant for the mode in question. Differentiation then yields $$|\delta \nu| = N'(c/2L)\delta L/L$$

or $$\delta \nu \delta \nu_{ax} = 2\delta L/\lambda$$

upon using $\nu = c/\lambda$, $\lambda \nu_{ax} = c/2L$, and the first expression for $\nu$. For $\delta \nu / \delta \nu_{ax} = \frac{1}{4}$ and $\lambda = 3$ μm we obtain $\delta L = 0.03$ mils.

4) External dispersive delay line

The fourth and final component of the invention is the dispersive delay line external to the optical cavity required to compress the chirped, outcoupled optical pulses. This apparatus will be in the form of a grating pair (shown in FIG. 11) or a prism pair (shown in FIG. 12) designed to provide a group velocity dispersion which will compensate the quadratic spectral phase content of the pulse. These pulse compressors are extensively described in the scientific literature and the general details of design and operation will not be discussed here. However, the following aspects must be considered in the implementation of these systems in the present invention.

First, the system must not absorb the light present in the broadband optical pulses. This is a trivial requirement in the case of a reflection grating pair, but in the case of a prism pair the prism material must have both low loss and large group velocity dispersion. For near-infrared optical pulses, prisms made of materials such as calcium fluoride, synthetic sapphire, or germanium are suggested. Calcium fluoride has good broad-band transmittance but the group velocity dispersion is relatively low, requiring large prism spacings in the compressor. Synthetic sapphire also has good broad-band transmittance and possesses a relatively large group velocity dispersion, but it is also birefringent; this birefringence can lead to high losses for poorly polarized input beams. Germanium possesses a large group velocity dispersion and is transparent in the infrared above ~ 3 microns, but is opaque in the visible making alignment of the system difficult.

Second, the sign of the group velocity dispersion of the compressor must match the sign of the frequency chirp of the optical pulses, to ensure compression of the pulses as opposed to broadening. In the present invention, the sign of the frequency chirp can be chosen to be either positive or negative, depending on the electron pulse energy chirp determined by the accelerator phasing. Conventional grating and prism compressors have a dispersion which tends to compress pulses with lower frequencies at the leading edge, and broaden pulses with the opposite chirp. Fortunately, the sign of the dispersion of these compressors can be reversed by inserting an inverting telescope between the compressor elements, and so a compressor can be designed which will compress pulses of either sign of chirp delivered by the laser. This modification is completely described in the prior literature, and the general details of design and operation will not be further discussed here.

BRIEF DESCRIPTION OF THE DRAWINGS

FIG. 1 shows an overview of the present invention which simultaneous fast time resolved and narrow spectral resolution FEL optical beams;

FIG. 2 illustrates the relative phasing between the electron pulses from the microwave gun and the accelerating field of the RF linac;

FIG. 3 illustrates the electron beam paths in a magnetic chicane system with dispersion;

FIG. 4 shows a conventional linear FEL optical cavity with mirrors and Brewster plate output coupler;

FIG. 5 shows the previous cavity modified to the form of a Michelson mirror resonator;

FIG. 6 shows the previous linear cavity modified to the form of a Fox-Smith interferometer;

FIG. 7 shows the configuration of optical pulses in a Michelson mirror resonator with 1 RF period of delay in the secondary arm;

FIG. 8 displays the axial optical mode structure for a conventional linear FEL optical cavity with 7% round trip losses;

FIGS. 9a,b,c display the axial optical mode structure of a Michelson mirror resonator with 50% beamsplitter reflectance, 7% round trip losses, and round trip transit times of, respectively, 2, 3, and 10 RF periods;

FIGS. 10a,b display the axial optical mode structure of, respectively, a Michelson mirror resonator and a Fox-Smith interferometer with a round trip time of 39 RF periods;

FIG. 11 shows a diffraction grating pair in the Littrow configuration serving as an optical dispersive delay line;

FIG. 12 shows a minimum deviation, Brewster angle prism pair serving as an optical dispersive delay line;

FIGS. 13a,b,c are computer generated plots of the phaselocked optical macropulse spectra from, respectively, a Michelson mirror resonator with 35 pulses and 50% reflectance after 5 passes, the same after 60 passes, and from a Fox-Smith interferometer with 35 pulses and 50% reflectance after 100 passes; and FIGS. 14a,b show computer simulations of the pulse and the compressed pulse.

PREFERRED EMBODIMENTS OF THE INVENTION

The embodiments described in this section generally pertain to, but are not limited to, the present operating configuration of the Mark III FEL. They are based upon previous performance achievements of that laser as well as on comprehensive computer simulations performed in order to evalute and optimize 1) the chirped pulse mode of operation, 2) the phaselocking capability of various multiple mirror resonators, and 3) the design of the external pulse compressor. The computer code used in these studies performs a one-dimensional integration of the coupled Maxwell-Lorentz equations of motion in a multipass oscillator configuration in which the optical pulses build up from noise to full saturation. The transverse Gaussian resonator modes are described using a complex filling factor to couple the electron and optical beams, and the full effects of both shot noise and quantum noise are properly simulated in the gain interaction.

Electron beam source and accelerator

A preferred embodiment of the electron beam source is the microwave gun used on the present Mark III FEL, and which is fully described in U.S. Pat. No. 4,461,103. A preferred embodiment of the accelerator is the 2.856 GHz, three meter travelling wave RF linac used to drive the present Mark III FEL. Based upon computer simulations to be described later, a preferred operating mode for the relative phasing of the electron pulses and accelerator field is to inject electron pulses with a duration of 6.0 ps at a phase of 10.6° (10.3 ps) relative to the peak of the RF field on the leading edge of the travelling wave. This will yield electron pulses possessing a 2.0% energy chirp with lower energies at the leading edge of the pulse.

Electron beam pulse compressor

A preferred embodiment of the electron beam pulse compressor is the four-dipole chicane preceeding the wiggler on the present Mark III FEL. This chicane system has a dispersion of 1 picosecond per percent energy spread in the beam. Given this dispersion, the electron pulses will be compressed to a width of 4.0 ps upon traversing this chicane path.

Optical cavity

The preferred embodiments for the optical cavity utilize either a Michelson mirror resonator or a Fox-Smith resonator. In each case, the interferometer employs a 50% beamsplitter and one RF period of delay in the secondary arm of the interferometer. The corresponding linear cavity contains 39 pulses. The beamsplitter should be a single surface reflector capable of withstanding large optical macropulse fluences; the use of a monolayer $TiO_2$ coating on a sapphire brewster plate is suggested by the previously investigated damage thresholds for these materials. The advantages of the Michelson mirror resonator are the relative ease of alignment and accomodation of the optical elements for given space constraints. The primary advantage of the Fox-Smith inteferometer is the increased interpulse coupling as compared to the Michelson mirror resonator; nevertheless, the beamsplitter reflectance should be kept close to 50% to minimize the risk of optical damage due to the large circulating power within the interferometer which can result from larger reflectances.

The Brewster plate output coupler preferably employs a single surface dielectric reflecting coating. This output coupler is positioned between the first cavity mirror and the beamsplitter.

The first and third cavity mirrors are mounted on stable, precision piezoelectric optical mounts, with both steering and longitudinal adjustment capabilities. The second cavity mirror will be mounted on a steerable but longitudinally stabilized mount.

External pulse compressor ($\lambda = 3.35 \ \mu m$)

The preferred embodiment of the pulse compressor is a minimum deviation Brewster angle sapphire prism pair with the crystal 'c' axis oriented parallel to both the input and output faces and a slant distance between the prisms on the order of tens of centimeters. The adjustment of the dispersion in this configuration is accomplished primarily by increasing the slant distance between the prisms.

An alternative compressor is a blazed grating pair in a Littrow configuration with a grating parameter of 3 $\mu m$ for the above wavelength and a separation on the order of tens of millimeters. An appropriate non-inverting telescope can be inserted between the gratings to increase the separation to several tens of centimeters while maintaining a dispersion adjustment on the order of millimeters.

Computer simulations of pulse compression

The operation of the preferred embodiment can be evaluated using the computer simulations discussed previously to explore the parameter space in which the electron micropulse length, the electron energy chirp, the optical wavelength, and the cavity length detuning are varied. An analysis of the optimum operating conditions for the preferred embodiment for an electron beam energy of $\mu = 83.2$ and a wavelength of $\lambda = 3.35$ $\mu m$ is summarized in the Appendix.

Computer simulations of phaselocking

The preferred embodiment of the multiple mirror resonator can also be evaluated with the computer simulations discussed previously. These simulations should span the parameter space including the number of pulses in the cavity, the number of RF periods of delay in the secondary arm, the output coupling, the beamsplitter reflectance, the phase offset at the third cavity mirror, and the detuning of the third cavity mirror. In all cases for which the mode analysis (described in a previous section) applies, the general behaviour of the optical macropulse evolution is accurately predicted, with only slight deviations which are due to the presence of noise in the simulations.

FIG. 13 shows the spectral evolution for both a Michelson mirror resonator and a Fox-Smith interferometer. The preferred pellicle reflectance is 50%, the preferred first cavity mirror detuning is 0.04 mils, and the preferred third cavity mirror detuning is zero mils. These parameters are compatible with simultaneous operation of the chirped pulse FEL for large pulse compression ratios.

Computer simulation of pulse compression

To operate a 'chirped-pulse' FEL, electron micropulses with a linear time-dependent energy are produced in the RF linac by positioning the bunches slightly off the peak of the RF wave at phases where the field gradient is large. These electron micropulses are injected into the wiggler and lead to the formation of optical pulses with a corresponding linear time-dependent frequency given approximately by the resonance condition:

$$\lambda_{opt} = \lambda_{wig}(1 + K^2)/2\gamma^2$$

where $\lambda_{opt}$ is the wavelength of the optical pulse, $\lambda_{wig}$ is the period of the wiggler magnet, $\gamma$ is the ratio of the electron mass to its rest mass, and K is the undulator parameter proportional to the wiggler B field. The time dependence of the optical frequency (or wavelength) obtains explicitly from the dependence of $\lambda_{opt}$ on $\gamma$, and the resulting 'chirped' optical pulses are then outcoupled from the optical cavity and compressed in an external dispersive delay line.

Simulations have been performed on electron micropulses with pulsewidths from 1 ps to 6 ps and FWHM chirps from $-3 \%$ to $+2 \%$ of the beam energy (with negatively chirped pulse energies decreasing towards the back of the pulse). These ranges of parameters are appropriate to the Mark III FEL. However, dispersion in the chicane path preceding the wiggler complicates the use of negatively chirped pulses because these pulses are spread out to longer pulsewidths and hence lower currents, causing severe incompatability between the linac's capability to provide useful chirps, and the FEL's requirement to provide sufficient gain. Therefore, simulations guiding the design of the experimental apparatus have concentrated on positively chirped pulses. In this regime, the operation of the FEL is actually enhanced by the chicane path because pulses from the linac are compressed to higher peak currents before injection into the wiggler. One other important advantage in using positively chirped pulses is that the intrinsic optical frequency chirp induced by the FEL interaction is also positive, yielding a net optical frequency chirp greater than that predicted by the resonance condition. Simulations have shown that this effect increases the optical frequency chirp by an average factor of 1.3 for pulses driven by a $+2 \%$ electron energy chirp. The reduced efficiency of the FEL interaction which arises from positively chirped pulses is not considered to be serious, because this effect only manifests itself for strongly saturated pulses. In contrast, the present experimental technique will outcouple the optical pulses at the onset of saturation in order to avoid distortion of the optical envelope and phase by the sideband instability.

Simulations based on feasible operating conditions for the linac, chicane path, and laser have demonstrated optical pulse compression by a factor of 8.3, from an initial pulsewidth of 2.3 ps to a final pulsewidth of 275 fs, at a wavelength of 3.35 microns and an electron energy chirp of $+2 \%$. Note that in the typical operation of a free-electron laser, the optical pulse length is usually constrained to be greater than the 'slippage length', which corresponds to a pulse with the same number of periods as the wiggler magnet. This is physically reasonable, since the electrons undergo this number of oscillations during their travel through the undulator. It is therefore interesting to note that the above pulse, obtained by energy chirping and pulse compression, represents an optical pulse almost half as long as the slippage length of 47 magnet periods for this wavelength. This compression was achieved by assuming quadratic phase compensation, and is demonstrated graphically in FIGS. 14a and 14b.

FIG. 14a shows the simulated envelope and phase of the outcoupled optical pulse after 100 round trips through the oscillator. The average micropulse power is just under 5 megawatts (which assumes that all of the outcoupled power is delivered into one beam), and the optical phase during the pulse shows the parabolic profile that is characteristic of an optical pulse with a linear frequency chirp (frequency is defined as the time derivative of the optical phase). A short pulse whose optical phase exhibits a quadratic time dependence transforms into Fourier components whose spectral phase exhibits a quadratic frequency dependence. The essence of the compression technique is then to 'compensate', or nullify, the spectral phase content of the pulse so that the remaining spectral envelope represents the Fourier transform of a very short pulse (the so called transform limited pulse). In effect, the temporal frequency chirp increases the spectral content of the pulse, and the process of compensation then redistributes this (conserved) spectral width between the envelope and phase functions.

FIG. 14b compares the original and compressed pulses on the same scale. The compressed pulse was obtained by propagation through a quadratic dispersive delay line optimized for the peak power. Both a grating pair and a prism pair alone approximate such a delay line very closely.

What is claimed is:

1. A free electron laser comprising:
   means for producing a relativistic electron beam consisting of a train of electron micropulses;
   means interposed in said electron beam for producing optical pulses from said electron micropulses;
   means defining an optical cavity for storing optical pulses so produced;
   means for phase locking the stored optical pulses, said means for phase locking being characterized by a substantial absence of dispersion; and
   output coupler means for allowing portions of said optical pulses to exit said cavity to provide an output optical beam.

2. The free electron laser of claim 1 where in said means for producing a relativistic electron beam comprises:
   an electron injector for providing electron bunches having a phase spread of at most a few degrees; and
   a linear accelerator for imparting energies on the order of approximately 20–100 MeV to electrons injected thereinto.

3. The free electron laser of claim 2 wherein said phase is approximately 5°–20° off the peak.

4. The free electron laser of claim 1 wherein said means for phase locking includes means for providing stable and sufficient coupling between successive optical pulses so as to phase lock optical pulses that are stored in the cavity.

5. The free electron laser of claim 4 wherein:
   said means for providing stable and sufficient coupling comprises means for extracting from said cavity and reinjecting into said cavity a portion of each optical pulse; and
   said means for extracting and reinjecting causes a time delay corresponding to the separation in time between pulses, which time delay can be adjusted on the scale of an optical wavelength, and is stable to within a small fraction of an optical wavelength.

6. The free electron laser of claim 4 wherein said means for providing stable and sufficient coupling comprises a Michelson mirror resonator.

7. The free electron laser of claim 4 wherein said means for providing stable and sufficient coupling comprises a Fox-Smith interferometer.

8. The free electron laser of claim 4 wherein:
   said means for providing stable and sufficient coupling comprises means for extracting from said cavity and reinjecting into said cavity a portion of each optical pulse; and
   said means for extracting and reinjecting causes a time delay corresponding to the time separation between optical pulses, which time delay is accurate to a small fraction of the duration of said optical pulses.

9. The free electron laser of claim 1 wherein said means for phase locking the stored optical pulses operates to phase lock all the stored optical pulses.

10. The free electron laser of claim 1 wherein said electron micropulses exhibit a substantially linear variation of energy as a function of time, and further comprising:
    a dispersive element disposed in said output optical beam to temporally compress said optical pulses in said output optical beam.

11. The free electron laser of claim 10 wherein said dispersive element comprises a prism pair.

12. The free electron laser of claim 20 wherein said dispersive element comprises a grating pair.

13. In a free electron laser in which a relativistic electron beam having a micropulse structure passes through a oscillator section that includes a wiggler for producing optical pulses and an optical cavity for storing optical pulses so as to provide a series of laser pulses in an output beam, the improvement comprising:
    chirp means for causing each micropulse in the electron beam to exhibit a substantially linear variation of energy as a function of time;
    phase lock means, disposed as part of the cavity, for providing coupling among the optical pulses stored in the cavity;
    output coupler means for allowing portions of the optical pulses stored in the cavity to exit the cavity to produce the output beam; and
    pulse compressor means, disposed in the path of the output beam, for temporally compressing the optical pulses in the output beam.

14. The improvement of claim 13 wherein:
    the relativistic electron beam is produced by an electron injector providing electron bunches having a phase spread of at most a few degrees and a linear accelerator imparting energies on the order of approximately 20–100 MeV to electrons injected thereinto; and
    said chirp means includes means for coupling the injector and accelerator so that said electron bunches are injected into said accelerator at a relative phase of approximately 5°–20° off the peak of the accelerating voltage of said accelerator.

15. The improvement of claim 13 wherein said phase lock means comprises means for extracting from the cavity and reinjecting into the cavity, a portion of each optical pulse with a time delay corresponding to the separation in time between pulses, which time delay is accurate to a small fraction of the duration of said optical pulses and is stable to within a small fraction of an optical wavelength.

16. The improvement of claim 13 wherein said output coupler means comprises a Brewster plate output coupler employing a single surface dielectric reflecting coating.

17. The improvement of claim 13 wherein said pulse compressor means comprises a prism pair.

18. The improvement of claim 13 wherein said pulse compressor means comprises a grating pair.

19. A free electron laser comprising:

an electron injector for providing electron bunches having a phase spread of at most a few degrees;

a linear accelerator for imparting energies on the order of approximately 20-100 MeV to electrons injected thereinto;

said injector and said accelerator being coupled so that said electron bunches are injected into said accelerator at a phase of approximately 5°-20° relative to the peak of the accelerator voltage of said accelerator so that each electron bunch exhibits a substantially linear variation of energy of a function of time;

a wiggler for subjecting said electron bunches to transverse oscillations for producing optical pulses;

an optical cavity for storing said optical pulses;

means for providing stable and sufficient coupling between successive optical pulses so as to phase lock the optical pulses that are stored in the cavity;

output coupler means for allowing portions of said optical pulses to exit said cavity to provide an output optical beam; and a dispersive element disposed in said output optical beam to temporally compress the optical pulses in said output beam.

20. The apparatus of claim 19 wherein said means for providing stable and sufficient coupling comprises a Michelson mirror resonator.

21. The apparatus of claim 19 wherein said means for providing stable and sufficient coupling comprises a Fox-Smith interferometer.

* * * * *

UNITED STATES PATENT AND TRADEMARK OFFICE
CERTIFICATE OF CORRECTION

PATENT NO. : 5,130,994

DATED : July 14, 1992

INVENTOR(S) : Madey et al.

It is certified that error appears in the above-identified patent and that said Letters Patent is hereby corrected as shown below:

Column 1, line 5, insert the following:

--This invention was made with Government support under contract DAAL03-88-K0109 awarded by U.S. Army Research Office. The Government has certain rights in this invention.--

Signed and Sealed this

Twelfth Day of April, 1994

Attest:

BRUCE LEHMAN

*Attesting Officer*       *Commissioner of Patents and Trademarks*